United States Patent [19]

Walton

[11] Patent Number: 5,072,487
[45] Date of Patent: Dec. 17, 1991

[54] DUCT CLEANING APPARATUS

[75] Inventor: James F. Walton, W. Boxford, Mass.

[73] Assignee: J. F. Walton & Co., Inc., Chelsea, Mass.

[21] Appl. No.: 616,379

[22] Filed: Nov. 21, 1990

Related U.S. Application Data

[63] Continuation-in-part of Ser. No. 389,743, Aug. 4, 1989, Pat. No. 5,020,188.

[51] Int. Cl.$^5$ .............................................. B08B 9/04
[52] U.S. Cl. .................................... 15/406; 15/304; 15/345; 134/167 C; 239/DIG. 13; 239/251
[58] Field of Search ............... 134/167 C, 168 C, 179; 15/104.05, 104.09, 104.12, 304, 345, 406, 302; 239/DIG. 13, 225.1, 245, 251

[56] References Cited

U.S. PATENT DOCUMENTS

| 1,444,889 | 2/1923 | Sladden | 134/167 C |
|---|---|---|---|
| 1,843,727 | 2/1932 | Lederman | 239/251 |
| 2,358,557 | 9/1944 | Boyd et al. | 15/306 X |
| 2,887,118 | 5/1959 | Loeffler et al. | 134/168 C X |
| 3,074,098 | 1/1963 | Downing | 15/406 X |
| 3,106,491 | 10/1963 | Leibner | 15/406 X |
| 3,120,346 | 2/1964 | Willhoite | 239/381 X |
| 3,267,504 | 8/1966 | Cook et al. | 134/167 C X |
| 3,485,671 | 12/1969 | Stephens | 15/302 X |
| 4,418,437 | 12/1983 | French | 15/104.09 |
| 4,763,376 | 8/1988 | Spurlock, Jr. et al. | 134/167 C X |

Primary Examiner—Philip R. Coe
Attorney, Agent, or Firm—M. Lawrence Oliverio

[57] ABSTRACT

A method and apparatus for cleaning the interior of ductwork or similar conduit from within, the apparatus comprising a small, pneumatically powered and controlled carriage of a size maneuverable inside the duct, with nozzle means provided for directing cleaning and disinfecting fluids, under pressure, at the walls of the duct, to execute a method of cleaning and disinfecting.

8 Claims, 6 Drawing Sheets

DUCT CLEANING APPARATUS

RELATED APPLICATIONS

This application is a continuation in-part of U.S. Ser. No. 07/389,743, filed Aug. 4, 1989, and now U.S. Pat. No. 5,020,188, and entitled DUCT CLEANING METHOD AND APPARATUS.

BACKGROUND OF THE INVENTION

The present invention relates to automatic cleaning methods and apparatus, and more particularly to apparatuses used for cleaning and disinfecting ductwork.

Bacteriae, molds, viruses, as well as various allergens have long been present in the damp, unclean environments within heating, ventilating and air conditioning (HVAC) systems. In recent years, medical specialists have learned that sickness may be caused and spread, and allergic reactions provoked, by these agents present in HVAC systems. These potentially harmful agents may be circulated by the HVAC system throughout an entire building.

In recent years, designers of HVAC systems have taken steps to inhibit the growth and spread of chemical and biological agents through their systems. These step include filtering the air intakes of the systems, and chlorinating or otherwise disinfecting the water used by and condensed from HVAC systems. While these approaches aid in preventing chemical and biological agents and allergens from entering HVAC systems, they do not effectively remove the biological agents and allergens already lining the ductwork of existing HVAC systems. Using existing methods, removing the contaminants might necessitate the removal of the ductwork. This is prohibitively costly. Therefore, a need exists for an apparatus capable of cleaning and decontaminating the existing ductwork of HVAC systems, and to do so without having to remove or substantially modify such ductwork.

SUMMARY OF THE INVENTION

The apparatus of the present invention comprises a pneumatically-controlled and pneumatically-powered cleaning carriage which facilitates inter alia, dislodging contaminants from the interior wall of the ductwork, removing by suction the contaminants from the ductwork, and disinfecting the same. The cleaning carriage is preferably a tracked vehicle small enough to maneuver inside existing HVAC ductwork. Upon this carriage is typically mounted a camera and a plurality of nozzle mechanisms for simultaneously directing high pressure streams of a cleaning fluid such as air at the interior surfaces of the walls of the ductwork. These nozzle mechanisms are also capable of directing a disinfecting fluid, such as an aqueous solution of bactericide, e.g. sodium hypochlorite, at the walls of the ductwork. Also mounted on the carriage is preferably a plurality of ultraviolet (UV) lights suitable for drying and further disinfecting the ductwork.

A preferred nozzle mechanism includes a rotating, conical head mounted on a hollow shaft. The head contains one or more apertures through which fluid is directed. The conical head contains a means within the interior of the spray nozzle for preventing fluid turbulence so that the spray nozzle can be operated more efficiently. A preferred means for preventing fluid turbulence includes a conical element within the spray nozzle. The apex of this conical element is substantially aligned with the axis of the hollow shaft.

In operation, the duct to be treated is opened at both ends, and any tributary ducts are sealed off. At one end of the ductwork, the carriage, trailing its control and power cables, is inserted. At the far end, suction means, such as a wet/dry vacuum means, are provided. Next, the cleaning carriage is directed down the length of the ductwork while it high pressure nozzles dislodge chemical contaminants, molds, spores, bacteriae, viruses, smoke particles, rust and any other contaminants which have built up over time and adhere to the walls of the duct. These contaminants are sucked into the suction means at the far end of the duct and are thereby removed from the ductwork.

When an entire length of ductwork has been cleaned, the cleaning carriage, now at the far end of the ductwork, is typically reversed in direction. It then is slowly propelled back along the duct length it just traversed. On the return trip of the carriage mechanism a liquid disinfecting fluid is directed from the nozzles at the duct walls and throughout the interior of the duct. Preferably during this phase of operation, no suction is provided at the far end of the duct.

Optionally a final step comprises sending the carriage on one or more round trips down the duct to be treated, this time with its UV lamps turned on. These lamps further dry the inside of and disinfect the duct.

The duct may be subsequently maintained in this state via filtration means provided at its intake. The treated ductwork, when provided with filter means, is much less likely to breed or transmit biological agents or allergens in the future. Contaminants which may escape any filter means provided, and recontaminate the ductwork in the future may be repeat cleaned and disinfected.

DETAILED DESCRIPTION OF TYPICAL PREFERRED EMBODIMENTS

The following description sets forth typical embodiments of a method and apparatus according to the invention.

Figure 4:
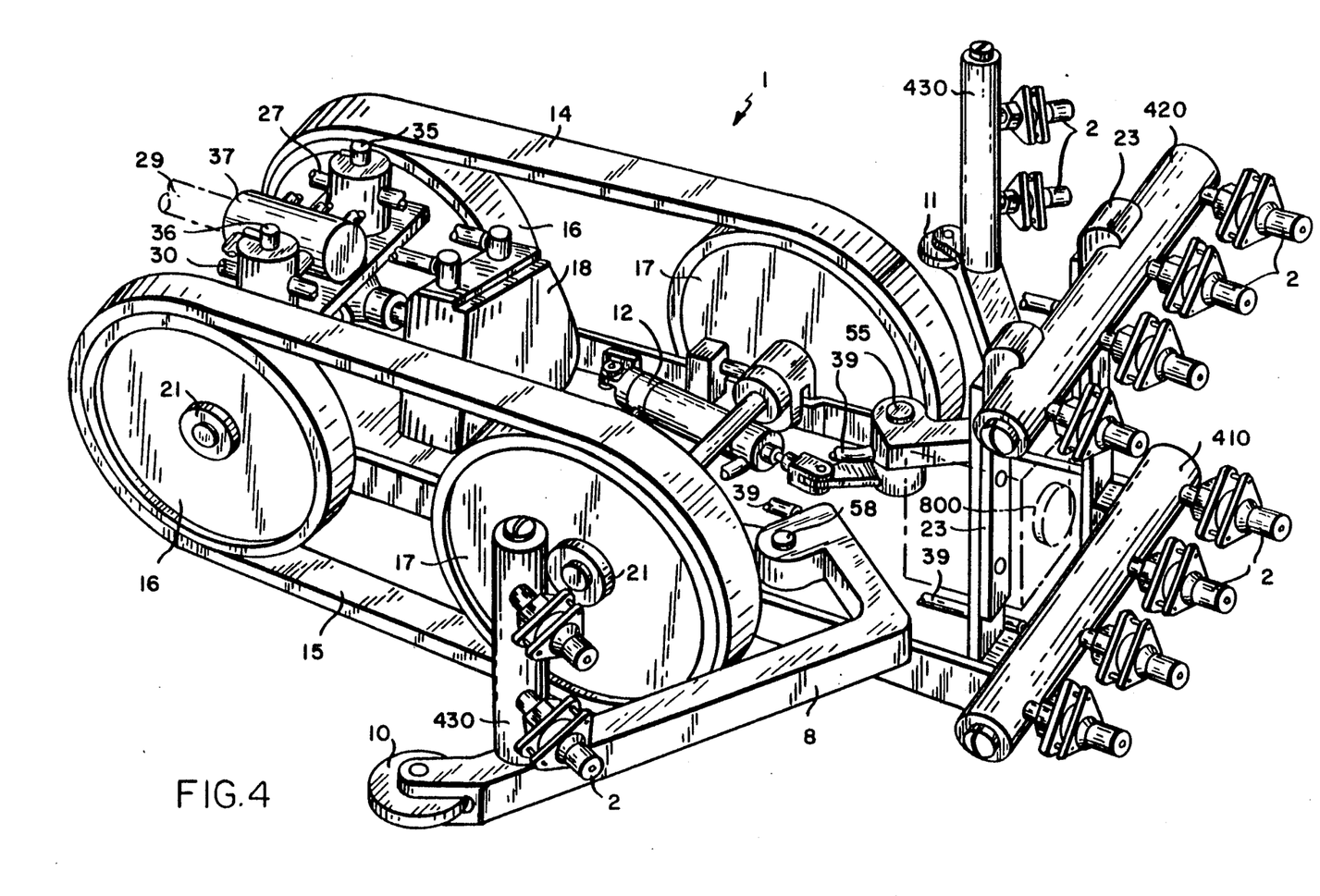
FIG. 4 is an isometric view of a cleaning carriage apparatus according to the invention.
Figure 5:
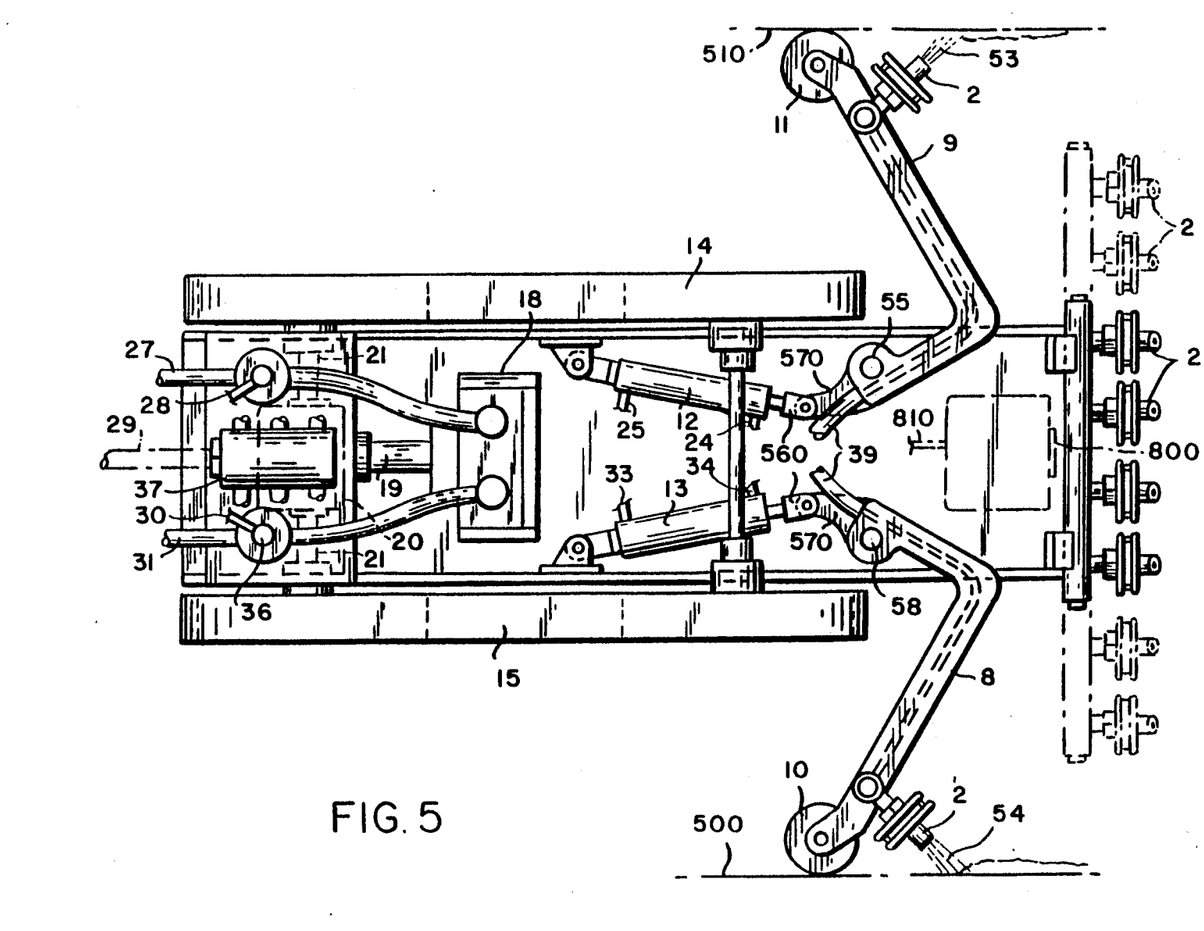
FIG. 5 is a top view of the FIG. 4 apparatus.

With reference to FIGS. 1, 4–6, the carriage 1 is inserted into one end 70 of a duct 75 to be cleaned. Air is injected into pneumatic lines 25 and 33, FIG. 6, so as to extend right stabilizer arm 8 and left stabilizer arm 9 into contact with the walls 500, 510 of duct 75, thereby centering the carriage. As shown in FIGS. 4, 5, arms 8, 9 are pivotable around pivots 58, 55 upon pneumatic actuation of the cylinder/piston assemblies 12, 13, the piston components of which are pivotally attached by conventional mechanisms 560, 570 to one end of the arms 8, 9 in such a manner as to effect pivoting of arms 8, 9 around points 58, 55 upon movement of the pistons within the cylinder of assemblies 13, 12. As shown in FIGS. 4, 5 the ends of arms 8, 9 are provided with wheel mechanisms 10, 11 which are freely rotatable and may make contact with the interior side walls of the ductwork 75 when the arms 8, 9 are pivoted outwardly.

High-pressure fluid is then supplied to the carriage via high pressure line 29. High pressure air line 29 terminates at the carriage in manifold 37, FIG. 4. High pressure lines 39 emanate from the manifold 37 and supply all of the nozzles 2 with high pressure cleaning and disinfecting fluids. To begin cleaning, high pressure fluid is supplied to all the nozzles 2 and is thereby applied to all of the interior walls of the duct 75 to be cleaned. The pressure of the fluid 53, 54, 700, FIGS. 1, 2, 5, exiting the nozzles 2, whether it is air or a liquid such a water, is selected to be great enough together with the nozzle aperture configuration so as to be able to act to dislodge inorganic or organic contaminants which might be adhering to the duct 75 walls. As shown in FIGS. 1–5, the nozzles 2 are typically mounted so as to direct the flows 53, 54, 700 emanating therefrom at the interior wall surfaces and toward the point of connection 77 of a typical vacuum assembly 80, with the ductwork 75. A variety of submanifolds 410, 420, 430 are typically provided for feeding selected fluids to a plurality of the nozzles 2. The submanifolds 410, 420, 430 are all connected to the same fluid feed line 39. In a typical embodiment of the invention, air is pumped into the system 29, 39 and out the plurality of nozzles 2 at a rate of between about 100 and 200 cubic feet of air per minute and the nozzle apertures are typically generally rectangular at their outer ends, typically between 0.5 and 3 inches long and 0.25 and 1 inch wide. The nozzle apertures are preferably configured so as to create a fan spray jet stream having a diverging angular spray A, FIG. 7, of between about 15 and 50 degrees relative to the axis of the feed aperture 710 leading into the nozzles 2.

Figure 12:
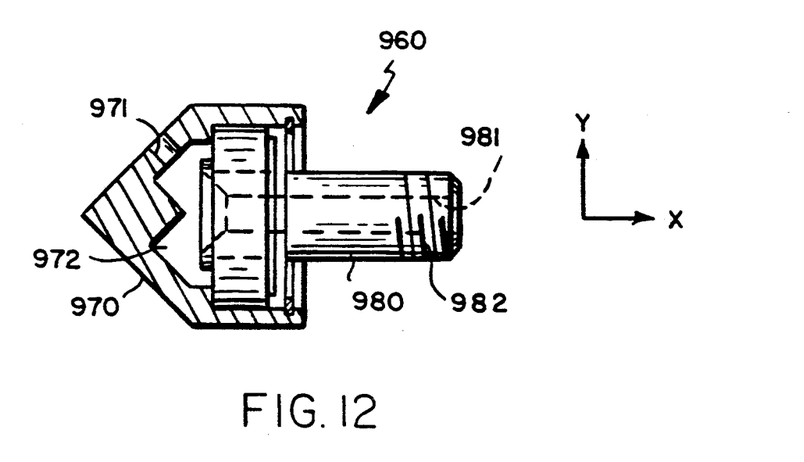
FIG. 12 is an axial cross-sectional view of a rotating fluid fan spray device for use as a fluid spray outlet component of the FIG. 4 apparatus, e.g. in substitution of the nozzles.

The nozzles 2 may alternatively comprise a structure 960 having a head 970 rotatably mounted on a shaft 980, FIG. 12. The head 970 is typically provided with a plurality of nozzle apertures 971 which communicate with a central feed aperture 981 provided in shaft 980. The end of shaft 980 may be provided with a mechanism for mating with a manifold 410, 420, 430, FIG. 4, such as a threaded end 982 for purposes of connecting fluid flow feed aperture 981 with the fluid being fed into a manifold 410, 420, 430. The head portion 970 is typically mounted by conventional ball bearing means on shaft 980 such that the head 970 is freely rotatable thereon. The nozzle apertures 971 communicate with the fluid aperture 981 via an intermediate feed canal 972 which connects apertures 971 with aperture 981. The axes of nozzle apertures 971 are preferably disposed at some angle, e.g. between about 30 and about 90 degrees, relative to an X Y cross-sectional plane intersecting the axis of the structure 960, FIG. 12, such that when fluid is routed through apertures 981, 972 and ultimately 971, the force of the fluid exiting the apertures 971 will exert a backward force against the inside surfaces of apertures 971 and cause the head 970 to rotate during fluid flow. As can be readily imagined, when fluid is pumped as described above into a manifold 410, 420, 430, the fluid will subsequently flow into aperture 981 and then into aperture 972 and eventually through and out apertures 971. For purposes of simplicity of illustration, only one aperture 971 is shown in FIG. 12, it being understood that typically a plurality of such angled apertures 971 would be provided in head 970.

It is desireable to provide rotation of the spray nozzle in a manner that most efficiently utilizes the available air and/or other fluids. It is therefore important to maximize the amount of laminar, non turbulent flow within the rotating spray nozzle head 970. A particularly preferred spray nozzle head meeting these requirements is shown in FIG. 12.

The nozzle head 970 includes an internal element 973 disposed within the conical head. The internal element 973 is itself preferably conical and defines an apex 974 extending substantially into intermediate feed canal 972. The apex 974 of the internal conical element 973 is aligned substantially with the axis of feed aperture 981. Fluid flows into aperture 981 and then into feed canal 972 where the fluid impinges upon the apex of internal element 973. The apex forces the fluid to diverge and flow in a non-turbulent manner out of the feed canal and into apertures 971.

Other means for reducing or preventing fluid turbulence within the spray nozzle head can include internal elements of the spray nozzle head that are not conically shaped. The configurations can include elements that are hemispherical or elements that contain a plurality of baffles. These configurations and their equivalents are meant to be encompassed by the spray nozzle of this invention.

Figure 13:
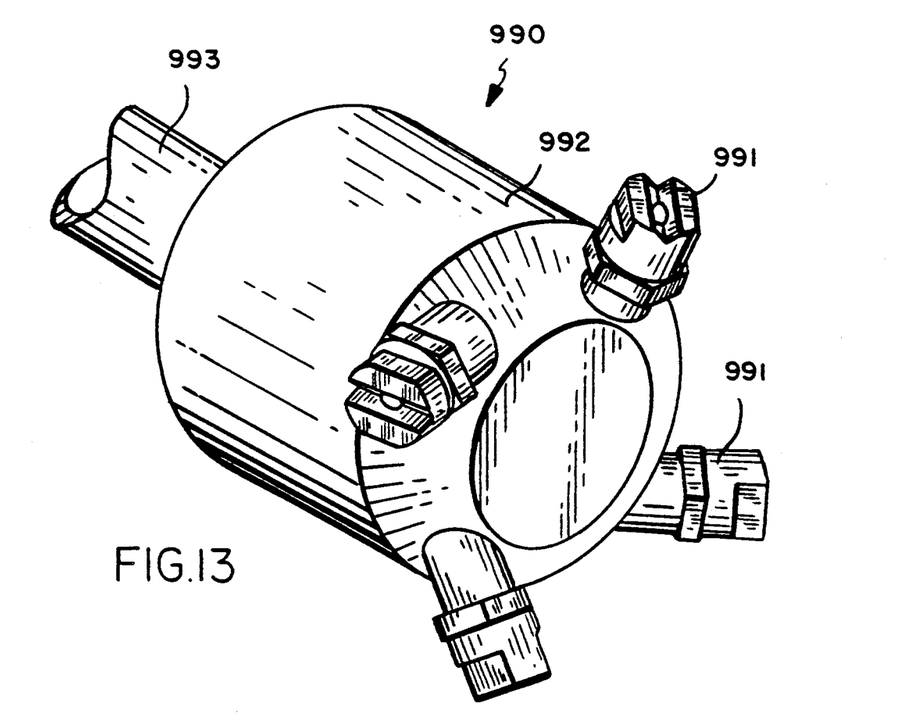
FIG. 13 is an isometric view of an exemplary embodiment of the device shown in FIG. 12, showing more clearly an angled disposition/mounting of nozzle outlets on the head of the device.

FIG. 13 illustrates another specific exemplary embodiment 990 of the structure 960 illustrated in FIG. 12. As shown in FIG. 13, a plurality of nozzles 991 are connected to the head 992 at about a 45 degree angle relative to a cross-sectional plane intersecting the axis of the structure 990. The nozzles 991 communicate with complementary apertures (not shown) and a canal (not shown) which are bored into the head 992. And the canal in the head 992 of course communicates with a central fluid flow aperture provided in shaft 993. The head 992 is rotatably mounted on the end of shaft 993 by conventional means such as ball bearings.

As can be readily imagined when fluid is pumped through a nozzle 971, 991, the head 970, 992 rotates and a relatively wide fan spray of fluid emanates from the forward end of structure 960,990. The use of wide fan spray structures such as 960, 990. FIGS. 12, 13, are preferred insofar as the use of simple nozzles such as 2, FIG. 4, may not necessarily provide a wide or divergent enough fluid spray to effect absolutely complete fluid spray contact with the inside surfaces of ductwork to be cleaned. The fan spray created by such structures 960, 990 may also be preferred insofar as the rotating head 970, 992 further serves to create a turbulence in the high pressure fluid exiting the structures 960, 990 and thus more effectively serve to remove materials on the inside surfaces of the ductwork.

To clean a length of the duct 75, valve 35 is actuated via pneumatic control line 28, FIGS. 4, 5, so as to permit fluid, typically air, in line 27 to power turbine 18, which, via drive shaft 19, powers gear reduction assembly 20 and, thereby, rear drive axle 21 and wheels 16, 17. Treads 14, 15 are elastically strung over the outside surfaces of wheels 16, 17 and typically act to provide better traction during movement of the carriage 1. Thus, the carriage 1 is propelled forward on treads 14, 15 when wheels 16 are pneumatically driven. Any conventional drive components (e.g. wheels, gear assemblies), could alternatively be employed in connection with a pneumatic turbine such as turbine 18 in order to effect the drivable movement of the carriage 1.

As carriage 1 moves forward, the high pressure fluid exiting nozzles 2 continually remove materials adhering to the duct 75 interior walls. These removed materials ar pushed ahead of the carriage 1 by the fluid exiting the nozzles 2. The dislodged material is also eventually caught up into a vacuum flow 520, FIG. 2, of air flowing forwardly of the carriage 1 by vacuum means 530, which is connected at a point 77 in the duct remote from that into which the carriage 1 had been inserted. The material which is dislodged from the duct walls is continually pushed toward the stream 520 as the carriage 1 is driven forwardly, FIGS. 1, 2, toward outlet 77. Stream 520 flows into a wet/dry vacuum means 80 that has a filtration liquid 540 inside. Air 520 dirty from the duct cleaning goes into the intake point 77 of the vacuum means 80 and bubbles up through the filtration liquid 540. The dirt, grit, contaminants and the like are trapped by the filtration liquid 540 and eventually settle to the bottom of the liquid 540 in the wet/dry vacuum means 80, and clean air 550 is exhausted from the wet/dry vacuum means 80. Typically during the course of the initial cleaning step, FIGS. 1, 2, any tributaries of the ductwork 75 are preferably sealed off by conventional mechanisms 450 such as plastic flaps or the like. Such sealing off of tributaries 400 enhances the ability of the exhaust system 530 to route the debris laden air 520 out of the ductwork.

To increase the tendency of the dislodged material to settle in the filtration liquid 540 inside the vacuum means 80, the liquid 540 inside the vacuum means 80 may be given a strong negative electrical charge by electrical charge means 100 such that it will attract the particles blown from the duct 75, which like most airborne pollutants, have a positive charge. Furthermore, the filtration liquid 80 may be provided with a disinfectant, bactericide or the like so as to render harmless the hazardous agents which it filters.

The carriage 1 may be advanced down an entire length of ductwork 75 in the above fashion. When an entire length of ductwork 75 has been cleaned, a disinfection operation of the ductwork 75 may be subsequently effected with the carriage 1.

Figures 2, 3:
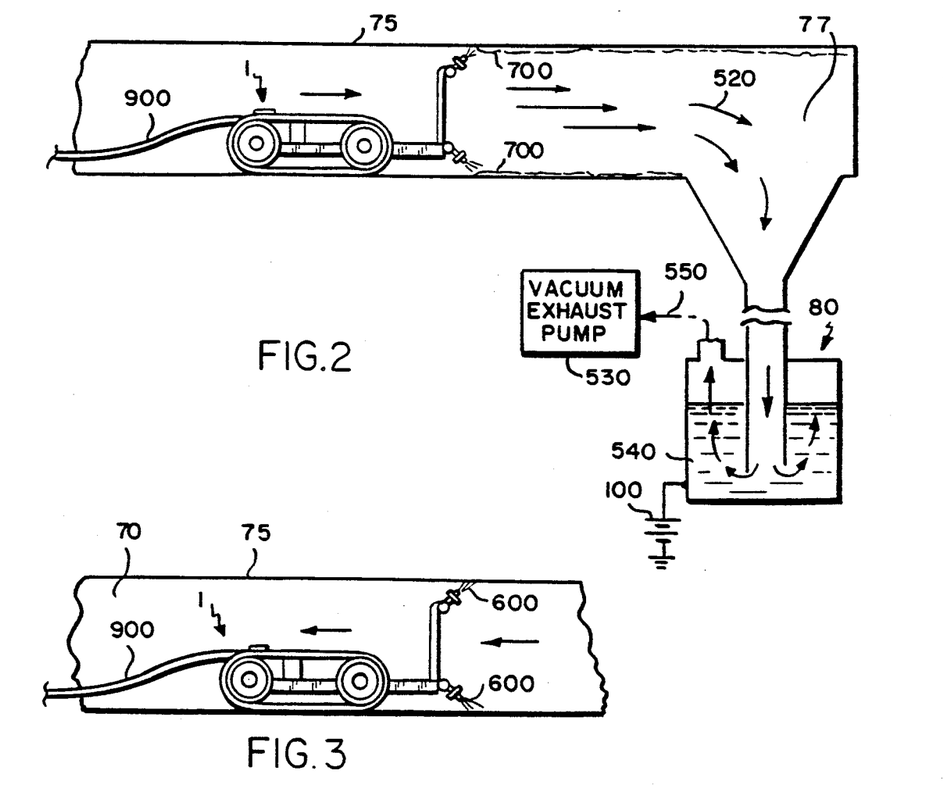
FIG. 2 is a side schematic view of FIG. 1 showing a typical mounting of fluid spray cleaning nozzles during an initial cleaning step according to the invention and showing the path of direction of fluid and debris dislodged by the fluid spray being suctioned out of the ductwork.
FIG. 3 is a side schematic view of a carriage apparatus according to the invention returning inside a typical HVAC duct during a typical disinfecting step according to the invention wherein a disinfectant containing fluid is being sprayed on the interior walls of the ductwork.

In a typical disinfection step, the carriage 1 which has been driven down a length of the ductwork 75 may be reversed, FIG. 3, in direction so as to traverse its path back to the duct opening 70 which it had entered, and spray a suitable disinfecting solution 600 on the same interior walls of the duct 75.

Figures 6, 7:
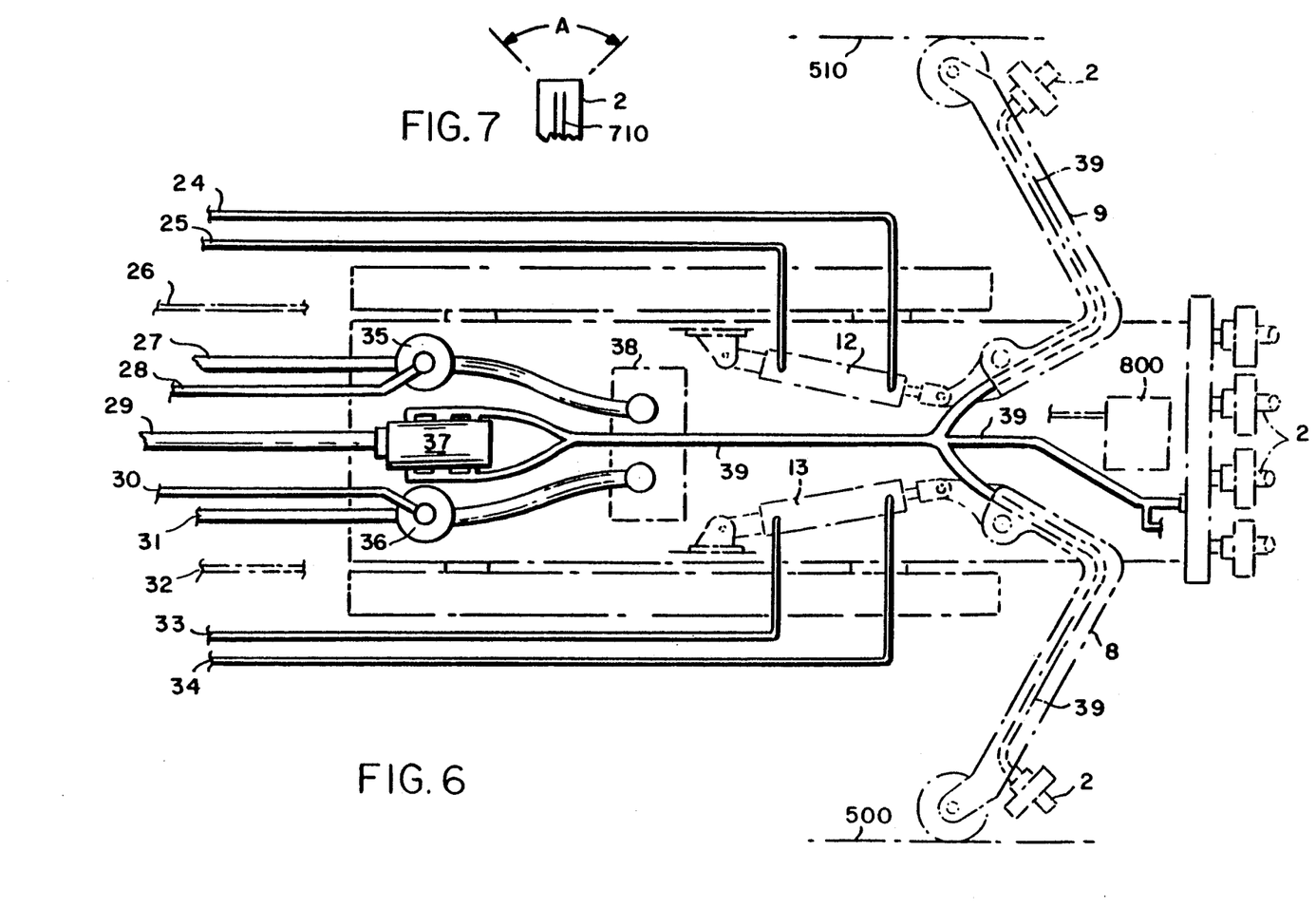
FIG. 6 is a pneumatic diagram showing a typical fluid feed protocol for operating the FIG. 4 apparatus.
FIG. 7 is a schematic cross-sectional view of a nozzle component of the FIG. 4 showing a typical fluid spray angle emanating from the nozzle.

Reversal of the carriage 1 is accomplished by actuating valve 36, FIGS. 4-6, via pneumatic control line 30, and supplying air into turbine 18 pneumatic feed line 31. This results in a reverse motion of the carriage 1, FIG. 3. Disinfecting solution may then be supplied to nozzles 2 via supply lines 39, manifold 37, and supply line 29, typically by injecting relatively small amounts of an aqueous solution of bactericide into a high volume of flow of air, typically in a volume ratio of between about 200:1 and 50:1 air to aqueous solution. Such injection of aqueous bactericide solution into a high volume of air stream results in a fine mist of solution 600, FIG. 2, emanating from nozzles 2 which more effectively coats the interior wall surfaces of ductwork 75 and is thus more effectively dryable in subsequent drying operations. As the carriage 1 moves backwardly towards the opening of duct 75, the walls of duct 75 are sprayed with the disinfectant solution 600 so as to inhibit future deposits and growth of microorganisms. When the carriage 1 has fully traversed its path back to the opening of duct 75, duct 75 is ready for its final drying and disinfecting step.

Most preferably air or other suitable gas is supplied to the nozzles 2 during the initial cleaning step, FIGS. 1, 2, of the operation in order to avoid leakage of liquid through the ductwork. The amount of liquid disinfectant solution injected into the nozzle 2 flow during the disinfecting step, FIG. 3, is preferably also maintained at such an amount, such as a 200:1 to 50:1 air to aqueous solution volume ratio, such that leakage of liquid solution through the ductwork 75 does not occur during the disinfecting step.

A drying and further disinfecting step may be accomplished using ultraviolet light. Ultraviolet lamps suitably mounted on the carriage 1 may provide this light. UV lamps (not shown) typically mounted on carriage 1 adjacent to turbine 18, may dry and disinfect the previously sprayed side interior sidewalls of the ductwork. UV lamps (not shown) typically mounted on support brackets 23 may do the same for the top and bottom walls of the duct 75. By traversing the carriage 1 forward in a manner similar to that depicted in FIG. 1, it is thus possible to dry and disinfect all walls of the duct using ultraviolet light. After this has been done, the carriage 1 can be reversed in direction as it was before and can be propelled out of the duct 75.

In a most preferred embodiment a video camera 800 is rotatably mounted at a forward position on the carriage 1 and is connected by conventional means 26 to a monitor at a control station (not shown) to allow the operator of the carriage 1 to view the path of progress of the carriage 1 through the ductwork FIGS. 1–3. Preferably the video camera 800 is mounted on a rotatable table which is also preferably pneumatically controllable for rotatable movement.

As shown in FIGS. 1–6, a plurality of feed lines 900 typically trail the carriage 1 during its forward, FIGS. 1, 2, and reverse, FIG. 3, trips through the ductwork 75. As shown in FIG. 6, the plurality of lines 900 may comprise in a typical embodiment as many as 11 separate pneumatic fluid feed tubes, 24, 25, 27, 28, 29, 30, 31, 33, 34 and lines 26, 32 which respectively provide electrical power and other appropriate inputs/outputs to and from the video camera 26 and ultraviolet lamps 32. In addition a pneumatic fluid feed tube connected to a rotatable mounting table for the video camera 800 might also typically be provided. All of the lines 900 connected at one end to the various components on the carriage 1 are typically connected at another end outside the ductwork to appropriate fluid feed pumps and electrical power sources. In a preferred embodiment of the invention a master control station is provided outside the ductwork 75. The master control station typically includes valves, switches, a television monitor and the like for controlling all of the fluid feeds, electrical power feeds and the like through lines 24-34.

Control of the valves 35, 36, assemblies 12, 13 and motor 18 could alternatively be effected via electrical-/electromechanical mechanisms. Pneumatic control of all these mechanisms is preferable however, inasmuch as a single pump mechanism may be employed to feed all of lines 24, 25, 27, 28, 29, 30, 31, 33, 34 with appropriate control valves or other conventional fluid flow control mechanisms connected to each line.

The combination of lines 900 trailing the carriage 1 through the ductwork 75 and out the end 70 through which the carriage 1 is inserted can serve to control the travel of the carriage 1 insofar as the operator may pull on or slacken the lines 900 from outside the ductwork 75. For example, if the carriage 1 tends to skew in its path of travel, the operator may pull on the lines 900 which will have a tendency to re-orient the longitudinal axis of the carriage 1 with the longitudinal axis of the ductwork, thus enabling the tracks 14, 15 to better drive the carriage 1 parallel to the longitudinal axis of the ductwork 75 and concomitantly maintain the proper orientation of the nozzles 2 relative to the interior walls of the ductwork 75 in the event of a skew in the travel of the carriage 1.

Figure 8:
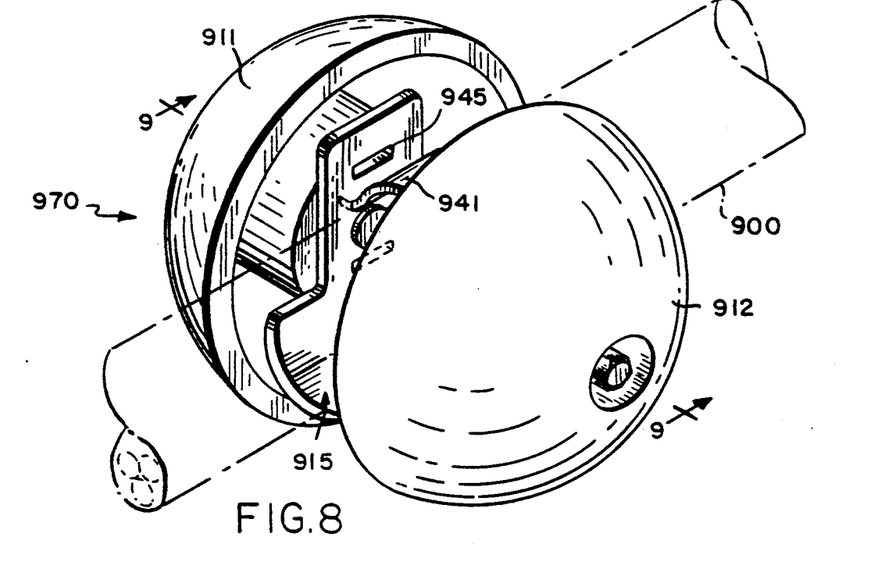
FIG. 8 is a side isometric view of a twist preventing roller assembly for use in conjunction with the method and apparatus of the invention.
Figure 9:
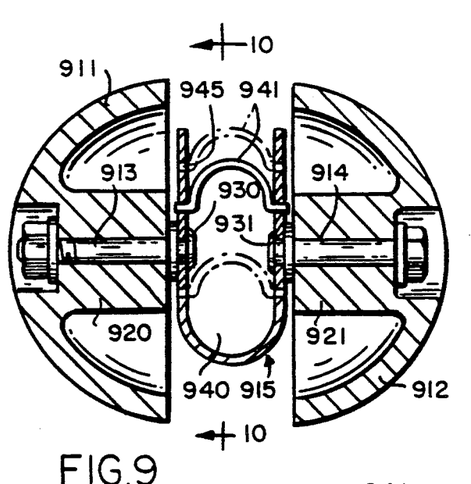
FIG. 9 is a cross-sectional view taken along lines 9—9 in FIG. 8.
Figure 10:
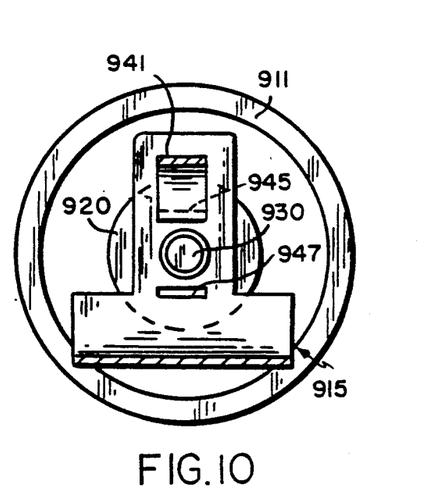
FIG. 10 is a cross-sectional view taken along lines 10—10 in FIG. 9.
Figure 11:
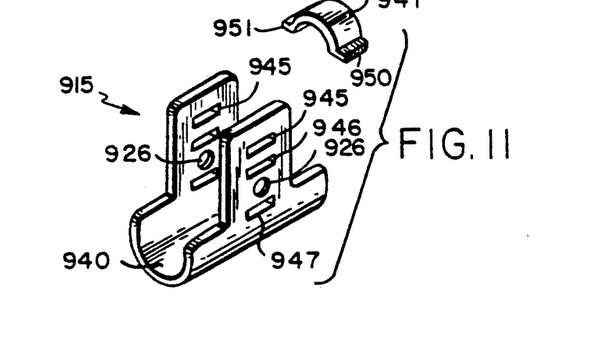
FIG. 11 is a side isometric view the saddle and clasp components of the FIG. 8 assembly.

The collection 900 of lines 24-34 is preferably bound together so as to form a generally cylindrical line 900. As the carriage 1 is routed down a substantial length, e.g. 25-200 feet, of ductwork 75, the line 900 may tend to twist. In order to minimize such twisting, the line is preferably mounted at one or more points along its length in a roller apparatus 910, FIGS. 8, 9. The apparatus 910 typically comprises a pair of opposing partial spheres 911, 912 rotatably connected by rods 913, 914 to a saddle 915, FIGS. 8-11. As best shown in FIG. 9, the rods 913, 914 are seated along a radius of the partial spheres 911, 912 in a radial aperture provided in housing sections 920, 921. The ends of the rods 913, 914 extend through mounting apertures 925, 926 in saddle 915 and include caps 930, 931 holding the saddle 915 on the ends of the rods 913, 914. The saddle 915 is freely rotatable relative to partial spheres 911, 912 and vice versa. As shown in FIG. 8, the line 900 is mounted in the recess 940 of saddle 915 at a selected point along the length of line 900 and a clasp 941 is snap fit over the top of the seated line 900 into one of a pair of opposing apertures 945, 946, 947, FIGS. 8, 9, 11. As shown in FIG. 9, the clasp 915 may alternatively be snap fit into any one of the pairs of apertures 945, 946, 947 depending on the thickness of line 900. The clasp 941 includes protrusions 950, 951 for insertion through apertures 945, 946 or 947 by bending clasp 941 inwardly and then releasing the clasp 941, which is resilient, to allow the protrusions 950, 951 to move back outwardly (by virtue of the resilience of clasp 915) and into one of the pairs of apertures 945, 946 or 947.

Figure 1:
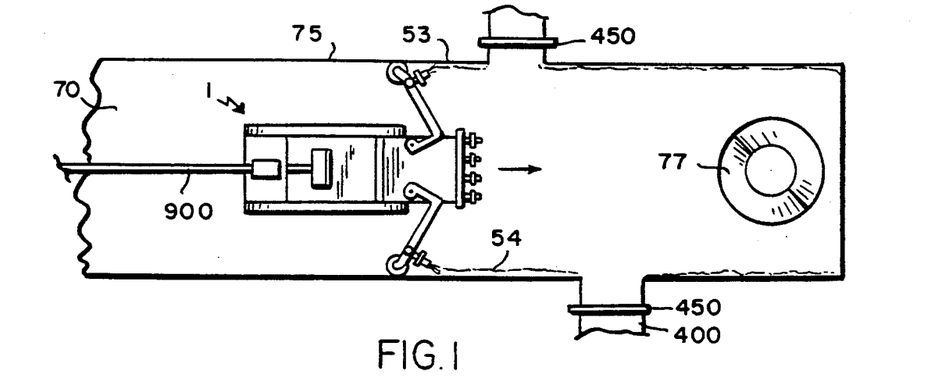
FIG. 1 is a top schematic view of a carriage apparatus according to the invention advancing forwardly inside a typical HVAC duct during an initial fluid spray step in a typical cleaning operation according to the invention.

Once the line 900 is mounted at appropriate points along its length to one or more roller apparati 910, as the line 900 is dragged forwardly along with carriage 1, FIGS. 1, 2, or pulled backwardly during reverse travel of carriage 1, FIG. 3, the outside surfaces of the partial spheres 911, 912 will support at least a portion of the line 900 above the bottom interior surface of the ductwork 75. Other portions of the line 900 will drag along the interior bottom surface of the ductwork 75 which may tend to cause the line 900 to twist. As the line 900 moves within the ductwork 75 the partial spheres 911, 912 will rotate (relative to the saddle 915) and also, by virtue of their partial spherical shape, tend to prevent the line 900 from twisting. Thus the apparatus 910 will tend to convert any twisting forces exerted on the line 900 during its movement through the ductwork 75 to rotation of the partial spheres 911, 912.

Most preferably the clasp 941 is fit into a pair of apertures 945, 946 or 947 such that the underside surface of the clasp 941 and the inside surfaces of the saddle 915 snugly engage the outside surfaces of the lines comprising line 900 whereby the device 910 will not slide along the length of line 900 during the normal course of movement of the carriage 1.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for cleaning ductwork having contaminant material built up over time on the interior wall surfaces thereof comprising:

a carriage means drivable through the interior of the ductwork for cleaning the interior walls thereof;

the carriage means including wheel means connected to a drive means for driving the carriage means forwardly and backwardly through the interior of the ductwork and a plurality of fluid spray nozzle means for directing a flow of one or more fluids at the surfaces of the interior walls of the ductwork;

vacuum means connected to the ductwork at a selected point along the length of the ductwork toward which the carriage means is driven during forward drive;

the fluid spray nozzles being mounted on the carriage means so as to direct a flow of a selected fluid at the interior surfaces of the walls of the ductwork and toward the point of the ductwork at which the vacuum means is connected;

pump means for inputting the selected fluid to the fluid spray nozzles at a rate sufficient to enable the flow of fluid emanating from the nozzles to dislodge the debris and contaminant material from the interior wall surfaces during forward drive of the carriage means and push the material toward the point of connection of the vacuum means with the ductwork;

means for injecting an aqueous solution into a flow of air pumped to the nozzle;

wherein the selected fluid is air during the forward drive of the carriage means, the nozzles being mounted so as to direct the air at the inner wall surfaces of the ductwork and toward the point of connection at the vacuum means with the ductwork, the vacuum means drawing the air emanating from the nozzles in a continuous flow;

wherein the carriage means includes arm means rotatable mounted on the carriage means for lateral movement toward and away from the interior wall surfaces of the ductwork, the arm means being connected to pneumatic actuation means for rotating the arm means inwardly and outwardly;

wherein the arm means includes said fluid spray nozzle means mounted thereon connected to a common source of fluid input to all nozzles mounted on the carriage means; and wherein each of the said fluid spray nozzle means comprise a nozzle head rotatably mounted on a shaft, each of the heads having a plurality of nozzle apertures and each of said shafts including a central aperture axially aligned within each shaft, engagement of the spray nozzle heads with the central apertures defining therein a feed canal, said central apertures, feed canals, and nozzle apertures of each nozzle means in communication for receiving and transmitting fluid; and means for preventing fluid turbulence within each nozzle head.

2. The apparatus of claim 1, wherein the nozzle means and drive means are connected to separate fluid feed tubes trailing the carriage means during forward and reverse drive through the ductwork.

3. The apparatus of claim 2, wherein the means for preventing fluid turbulence of each fluid spray nozzle includes an internal element within the nozzle head, said internal element having an apex, the apex of said element extending substantially into the feed canal and wherein said apex is aligned substantially with the central aperture for receipt of fluid thereon.

4. The apparatus of claim 1, wherein the nozzle means, drive means and pneumatic arm actuation means are connected to separate fluid feed tubes trailing the carriage means during forward and reverse drive through the ductwork.

5. The apparatus of claim 4, wherein the means for preventing fluid turbulence of each fluid spray nozzle includes an internal element within the nozzle head, said internal element having an apex, the apex of said element extending substantially into the feed canal and wherein said apex is aligned substantially with the central aperture for receipt of fluid thereon.

6. The apparatus of claim 1, wherein the means for preventing fluid turbulence of each fluid spray nozzle includes an internal element within the nozzle head, said internal element having an apex, the apex of said element extending substantially into the feed canal and wherein said apex is aligned substantially with the central aperture for receipt of fluid thereon.

7. An apparatus for traversing a conduit and cleaning and disinfecting it from within, said apparatus comprising:

a carriage;

means attached to the carriage for supporting the carriage in the conduit;

means attached to the carriage for moving the carriage through the conduit;

a plurality of high pressure nozzle means supported by a plurality of nozzle mounting means mounted on the carriage, each of the said nozzle means comprising a nozzle head rotatably mounted on a shaft, the head having a plurality of nozzle apertures, said shaft including a central aperture axially aligned within the shaft, engagement of the nozzle head with the central aperture defining therein a feed canal, and wherein said central aperture, feed canal and nozzle aperture are in communication for receiving and transmitting fluid;

means for preventing fluid turbulence within the spray nozzle head of each nozzle means;

means for disinfecting the conduit mounted on the carriage;

means for controlling the apparatus connected to the carriage; and means for providing air and other cleaning and disinfecting fluids to the high pressure nozzle means for disbursal therethrough.

8. The spray nozzle of claim 7, wherein the means for preventing fluid turbulence within the nozzle head of each nozzle means includes an internal element within the nozzle head, said element having a conical apex, said apex extending substantially into the feed canal and wherein said apex is aligned substantially with the central aperture for receipt of fluid thereon.

* * * * *